(12) United States Patent
Alexander et al.

(10) Patent No.: US 8,514,707 B2
(45) Date of Patent: Aug. 20, 2013

(54) NON-BLOCKING ADMISSION CONTROL

(75) Inventors: D. Scott Alexander, Warren, NJ (US); Ravichander Vaidyanathan, Belle Mead, NJ (US); Balakrishnan Dasarathy, Bridgewater, NJ (US); Mark W. Garrett, Seattle, WA (US); Shrirang Gadgil, Eatontown, NJ (US)

(73) Assignee: TTI Inventions D LLC, Wilmington, DE (US)

( * ) Notice: Subject to any disclaimer, the term of this patent is extended or adjusted under 35 U.S.C. 154(b) by 634 days.

(21) Appl. No.: 12/647,597

(22) Filed: Dec. 28, 2009

(65) Prior Publication Data

US 2011/0158095 A1    Jun. 30, 2011

(51) Int. Cl.
*H04J 1/16*    (2006.01)

(52) U.S. Cl.
USPC ............ 370/232; 370/230; 370/229; 370/231

(58) Field of Classification Search
USPC ................ 370/232, 230, 229, 231, 233, 234, 370/235, 238, 310, 351, 352, 328, 392, 400, 370/431, 337, 347, 436, 342, 341, 343, 336, 370/335, 389; 709/227, 225, 229, 238; 455/451, 452, 453, 522
See application file for complete search history.

(56) References Cited

U.S. PATENT DOCUMENTS

| | | | | |
|---|---|---|---|---|
| 6,055,564 | A * | 4/2000 | Phaal | 709/207 |
| 6,816,500 | B1 * | 11/2004 | Mannette et al. | 370/431 |
| 7,003,578 | B2 | 2/2006 | Kanada et al. | |
| 7,154,851 | B1 | 12/2006 | Fedyk et al. | |
| 7,191,267 | B2 | 3/2007 | Noda et al. | |
| 7,394,811 | B2 * | 7/2008 | Gibson et al. | 370/392 |
| 7,526,792 | B2 | 4/2009 | Ross | |
| 7,606,146 | B1 | 10/2009 | Pan et al. | |
| 7,836,191 | B2 * | 11/2010 | Susai et al. | 709/229 |
| 2004/0044772 | A1 * | 3/2004 | Harkin | 709/227 |
| 2005/0197148 | A1 * | 9/2005 | Ali et al. | 455/522 |
| 2006/0251419 | A1 * | 11/2006 | Zadikian et al. | 398/51 |
| 2007/0076615 | A1 * | 4/2007 | Lea et al. | 370/238 |
| 2007/0115918 | A1 * | 5/2007 | Bodin et al. | 370/352 |
| 2007/0237078 | A1 * | 10/2007 | Hundscheidt et al. | 370/235 |
| 2007/0242616 | A1 * | 10/2007 | Chang et al. | 370/252 |
| 2008/0037425 | A1 * | 2/2008 | Pan et al. | 370/235 |
| 2008/0301754 | A1 | 12/2008 | Furuichi et al. | |
| 2009/0141624 | A1 * | 6/2009 | Lea | 370/230 |

(Continued)

FOREIGN PATENT DOCUMENTS

| KR | 10200110087318 | 9/2001 |
|---|---|---|
| WO | WO 2009/048889 | 4/2009 |

OTHER PUBLICATIONS

International Preliminary Report on Patentability for PCT/US2010/060373, issued Jul. 4, 2012.

(Continued)

*Primary Examiner* — Abdullah Riyami

(57) ABSTRACT

A method for controlling network access comprises receiving a request to allow a communication flow over a network and temporarily allowing the communication flow over the network before a response to the request is transmitted. Further, the availability of one or more network resources may be determined and compared with resources required for the requested communication flow. Priority of the communication flow may also be determined, and the temporarily allowed communication flow may be responded to based on the available resources, the requested resources, and the priority.

27 Claims, 7 Drawing Sheets

(56) References Cited

U.S. PATENT DOCUMENTS

| | | | |
|---|---|---|---|
| 2009/0328117 A1* | 12/2009 | Morris et al. | 725/105 |
| 2010/0011118 A1* | 1/2010 | Chang et al. | 709/235 |
| 2010/0135287 A1* | 6/2010 | Hosain et al. | 370/389 |
| 2010/0157887 A1* | 6/2010 | Kopplin | 370/328 |
| 2010/0329118 A1* | 12/2010 | Adams | 370/235 |

OTHER PUBLICATIONS

International Search Report issued on PCT/US2010/060373, mailed Feb. 25, 2011.

* cited by examiner

NON-BLOCKING ADMISSION CONTROL

BACKGROUND

Admission control systems mediate access to network resources such as bandwidth by admitting or denying requests for network resources. Admission control systems typically suffer from delays associated with the request-response messaging required for gaining authorized access to network resources. For certain classes of high priority traffic or certain users with low delay tolerance, the delay associated with admission control may be intolerable.

For example, one approach is to build a blocking network admission scheme used by today's bandwidth brokers. According to the network admission blocking scheme, all applications must wait for a response from a network admission control before transmitting any packets over the network. Thus, the communications may be unnecessarily delayed, especially in the case where ample bandwidth is available.

Traditional solutions have solved only part of the problem. One solution is over-provisioning, where a network is built with enough resources that there will never be scarcity of available bandwidth. However, to build such a network involves a large cost.

Accordingly, in view of the foregoing deficiencies, a low cost network which provides adequate resources and immediate access is currently desired.

SUMMARY

One aspect of the present invention provides a method for controlling network access, comprising sending a request to allow a communication flow over a network and temporarily starting that flow before a response to the request is received.

Another aspect of the present invention provides a method for controlling network access, comprising receiving a request to allow a communication flow over a network and temporarily allowing the communication flow over the network preferably before a response to the request is transmitted. The method may further comprise determining availability of a network resource; comparing the available resource to a resource required for the requested communication flow; determining a priority of the communication flow; and responding to the temporarily allowed communication flow based on the available resource, the requested resource, and the priority.

Further in accordance with this aspect of the present invention, the resource is selected from the group consisting of bandwidth, latency, jitter and processing time.

Further still in accordance with this aspect of the present invention, the method may further comprise marking packets transmitted in the communication flow to designate priority. In addition, the method may comprise setting a policy for responding to the temporarily allowed communication flows based on their packet markings, content of the communication flow or an application defining the type of communication flow.

In addition, the method may comprise modifying the resource allocated to communication flows allowed over the network is performed in response to receipt of a request for communication flow with a higher priority than the allowed flow.

According to a further aspect, the temporarily allowed communication flow may be pre-provisioned by reserving the network resources. The amount of reserved bandwidth may vary from one communication flow to the next based on at least one of the type of communication or a priority of the communication. Priority of the communication flows may be designated by packet marking. The priority may be based on the content of the communication flow, the application defining the type of communication flow, etc. Therefore, packets marked with higher priority may be handled differently than those with normal markings. This reserved bandwidth may be modified in response to a determination of how to handle the communication flow.

Another aspect of the invention provides a system for managing network access, comprising an input for receiving a request to communicate over the network, a resource determination unit determining one or more available resources on the network at a time of receiving the request, and a memory storing a network admission policy, wherein the network admission policy permits temporary communication over the network before a response to the request is transmitted, and wherein the network admission policy defines which requests to communicate over the network will be granted based on at least one of available bandwidth, bandwidth required by the communication, and priority. Further, a network admission policy enforcement unit may execute the network admission policy and transmit a response to the request. According to one embodiment, the system may further include a policy creation unit enabling a user to set or modify the network admission policy. Even further, an update mechanism may update the network admission policy, for example, based on communications allowed to the network at the time the request is received.

Yet another aspect of the invention provides a computer readable medium storing a program executable by a computer, the program comprising receiving a request to admit a communication flow to a network, temporarily admitting the communication flow to the network, determining an amount of available bandwidth on the network, comparing the amount of available bandwidth to an amount of bandwidth required for the requested communication flow, determining a priority of the communication flow, and handling the temporarily admitted communication flow based on the amount of available bandwidth, the amount of required bandwidth, and the priority.

In yet another aspect the present invention is a method for accessing a network comprising sending, by a client device, a request for access to one or more network resources; and accessing the one or more network resources before a response to the request is received.

In accordance with this aspect of the present invention, the request may comprises a request for communication flow over the network and the one or more network resource comprises bandwidth. In addition, a response to the request comprises allowing the communication flow, terminating the communication flow, or modifying the resources allocated to the communication flow.

Further still, the method may comprise marking one or more packets transmitted in the communication flow to designate priority. The method may also comprise marking the one or more packets at an application layer, operating system, or on an edge router. The method may further comprise determining whether access to resources should be made available using a policy engine associated with the client device.

In addition, determining may comprise setting a policy for providing access based on markings in a packet, content of a communication flow or an application defining a type of communication flow.

According to another aspect of the invention, a method for controlling network access may comprise receiving a request to allow a communication flow over a network from an application, determining a priority of the requested communication flow, and transmitting a response to the application, the response indicating access rights for the application. Availability of a network resource may then be determined, and network resources may be allocated to the application. Further, network resources allocated to other communication flows on the network may be modified based on the availability of the resource and priority.

DETAILED DESCRIPTION

Figure 1:
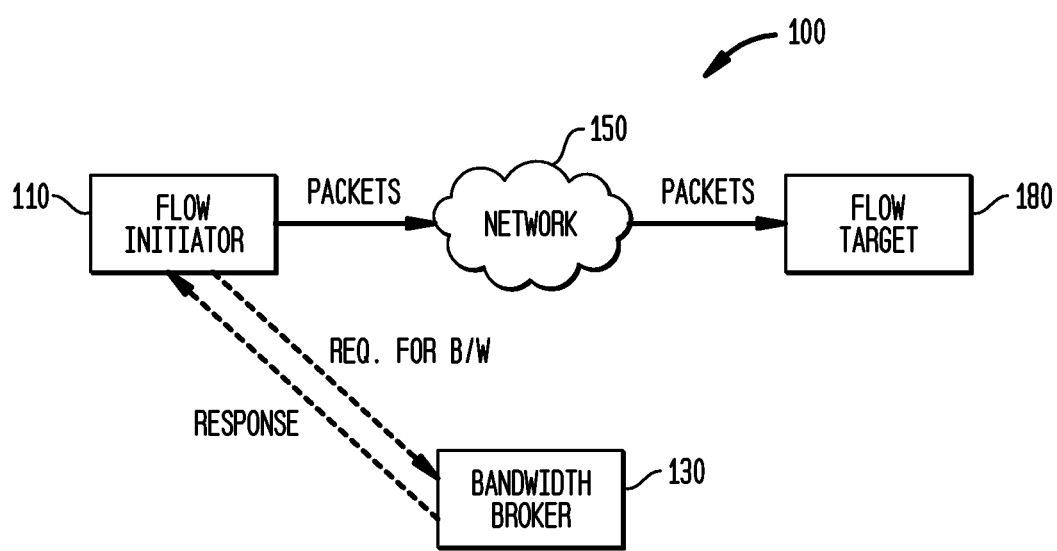
FIG. 1 illustrates an admission control system according to an aspect of the invention.

FIG. 1 shows a system 100 for managing communications over a network. A flow initiator 110 wishing to send packets to a flow target 180 through a network 150 may first transmit a request to asynchronous bandwidth broker 130. The request may ask for permission to utilize an amount of bandwidth for an amount of time for an application, such as instant messaging (IM), voice over Internet protocol (VoIP), etc. In turn, the bandwidth broker 130 may transmit a response to the flow initiator 110, indicating whether the request was granted or denied. However, the flow initiator 110 need not wait for the response from the bandwidth broker 130 before beginning to transmit packets to the flow target 180. That is, the flow initiator 110 may be admitted to the network prior to being granted access by the bandwidth broker 130. For example, the flow initiator 110 may include a local policy engine which determines that the flow initiator 110 may begin transmissions over the network 150 prior to receiving a response from the bandwidth broker 130. If the response from the bandwidth broker 130 grants the request from the flow initiator 110, the flow initiator 110 may continue to access the network 150 for the requested amount of time consuming specified resources. However, if the response from the bandwidth broker 130 denies the request, the flow initiator 110 will typically be instructed to cease transmitting packets for that flow.

In accordance with an aspect of the present invention, the asynchronous Bandwidth Broker or aBB 130, as well as any point or node that wants to start a flow preferably implements the policy, e.g., as a policy engine or concomitant instructions, code or software. Since the source will typically make the decision about how to start and mark the flow before it has received a response from the aBB, it typically must have its own policy engine to cover that period. The policy engine in the aBB will typically then be used to fill in some of the information in the response which will, in effect, override the source's local policy engine.

One feature of a system embodying this aspect of the present invention is that the response from the aBB, if it denies the request for resources, will typically be interpreted by the source as a pre-emption, that is a direction to quit transmitting. In military systems, there are systems with synchronous Bandwidth Brokers or BB. In such systems, the source does not transmit until it gets a response from the BB. It may later receive a pre-emption message if a higher priority flow is to be admitted at which point it must stop transmitting. In commercial systems, the source waits until a response is received from the BB. If that response denies the requested resources, the flow is not admitted and dies. If it is non-zero, the flow is guaranteed those resources even if a higher priority flow arrives later.

Note also that in accordance with a further aspect of the present invention, each policy engine may have the complete policy or can have a tailored part of the policy specific to that node, its applications, or its functions. Thus, an aBB typically needs to have policy sufficient to allow it to determine priorities, whether to admit, and how to mark any flow that might appear in the network. It does not typically need the policies for how to prioritize, admit and mark flows before the aBB has responded. The source nodes each typically need policies sufficient to allow them to prioritize, admit and mark any flows that they may originate. In some instances, it may be useful to also have the policies for how to process those flows after the decision of the aBB to provide information to a user, client or node, but it is not necessary. Even further, a specialized device (e.g., a VoIP phone) may only have the pre-aBB policies for voice related connections since those are likely the only flows which it may be capable of originating.

The network 150 may be any public network, such as the Internet, or any private network. For example, the network 150 may be a virtual private network operating over the Internet, a local area network, or a wide area network. Moreover, the network 150 may include any number of sub-networks and may operate according to any of a number of different protocols or standards.

Although only the flow initiator 110 and the flow target 180 are depicted in FIG. 1, it should be appreciated that a large number of connected computers may be communicating over the network 150 at a given time. The flow initiator 110 and the flow target 180 may be general purpose computers having all the internal components normally found in a personal computer such as, a central processing unit (CPU), display, CD-ROM, hard-drive, mouse, keyboard, modem, etc. For example, the flow initiator 110 and the flow target 180 may communicate over the network 150 via a modem or some other communication component such as a network card. The flow initiator 110 and the flow target 180 may comprise any device capable of processing instructions and transmitting data to and from humans and other computers, including network computers lacking local storage capability, PDA's with modems and Internet-capable wireless phones. The flow initiator 110 and flow target 180 may also include applications running on such devices. For example, the application initiating the flow on the flow initiator 110 may be VoIP, IM, web browser, online gaming, email, music streaming software, etc.

The asynchronous bandwidth broker 130 may similarly be any device capable of processing instructions and transmitting data to and from other computers. For example, the bandwidth broker 130 may be a general purpose computer or any type of conventional server, such as a web server or a groupware server.

Figure 2:
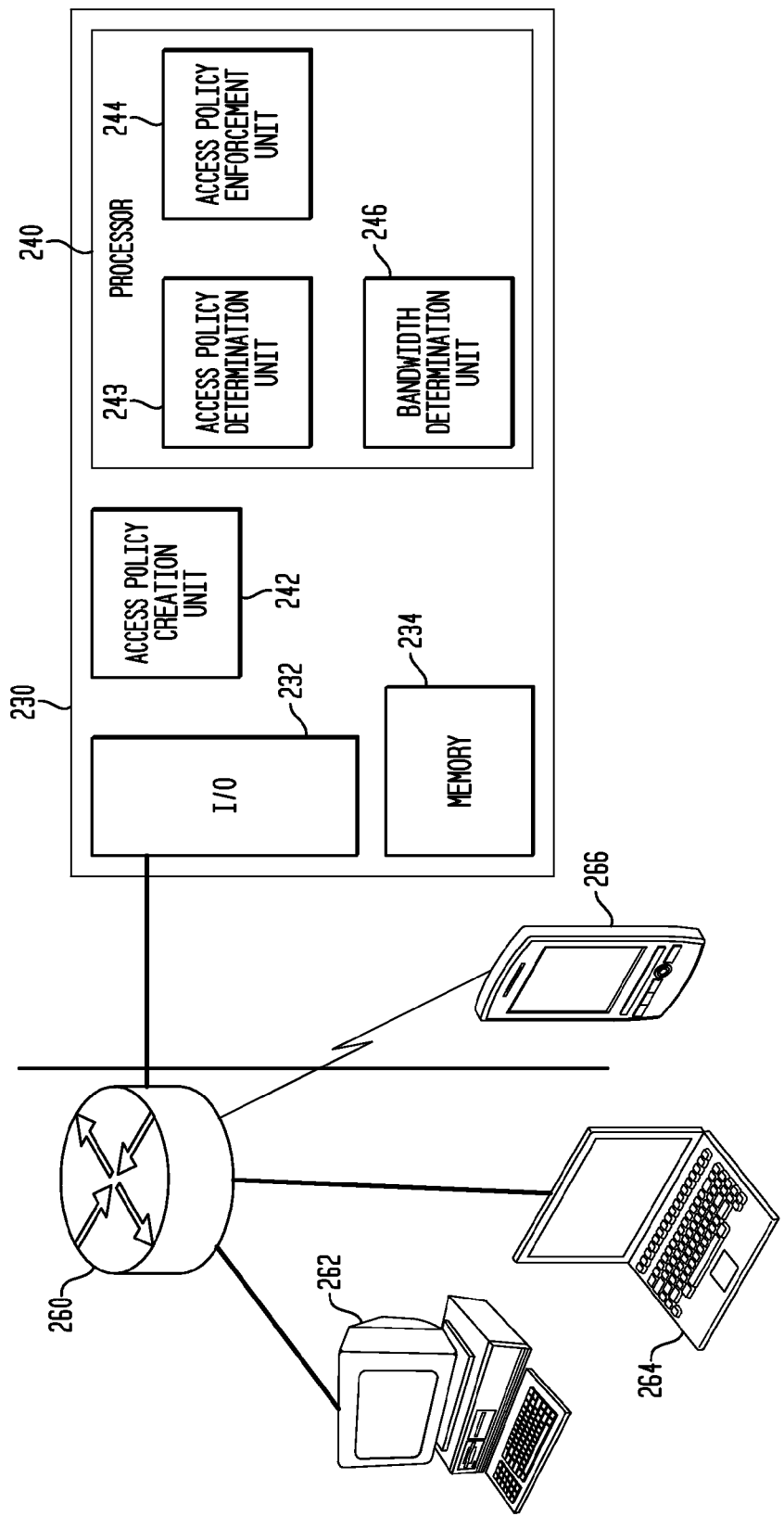
FIG. 2 illustrates an admission control unit according to an aspect of the invention.

Turning now to FIG. 2, a detailed view of bandwidth broker 230 is provided. In this example, network computers 262-266 (e.g., flow initiators) are connected with each other via router 260. Also connected with the network computers 262-266 and the router 260 is the bandwidth broker 230. Although the bandwidth broker 230 is shown as a separate component from the router 260, it should be understood that the bandwidth broker 230 may be a unit within the router 260. For example, the bandwidth broker 230 may be a virtual component executable on the router 260. Accordingly, the bandwidth broker 230 and the router 260 may share components, such as a memory and/or a processor. In that regard, it should be understood that not all hosts, e.g., client devices or flow initiators 262, 264, 266, will be served by the same router.

According to the example of FIG. 2, the bandwidth broker 230 may include a number of components for use in managing the bandwidth allocation to various flow initiator devices. For example, the bandwidth broker 230 may include an input/output (I/O) port 232, memory 234, an access policy creation unit 242, and a processor 240. The processor 240 may further include an access policy determination unit 243, an access policy enforcement unit 244, and a resource determination unit 236. These units may be software modules executable on the bandwidth broker 230, or hardware components interfaced with the other components of the bandwidth broker 230. Further, while these units are depicted in FIG. 2 as separate entities, it should be understood that some units may actually be part of another component. For example, the access policy creation unit 242 may actually be a set of instructions stored within memory 234.

The processor 240 may comprise any number of well known hardware-based processors, such as a CPU from Intel Corporation or Advanced Micro Devices. Alternatively, the processor may be a dedicated controller for executing operations, such as an ASIC.

The I/O port 232 may be used to connect to a number of network computers 262-266 through a router 260. The memory 234 stores information accessible by processor 240, including instructions for execution by the processor 240 and data which is retrieved, manipulated or stored by the processor 240. It will be understood that memory 234 may be of any type capable of storing information accessible by the processor, such as a hard-drive, ROM, RAM, CD-ROM, write-capable, read-only, or the like.

Access policy creation unit 242 provides an interface for users to input the criteria for determining which communication flows to admit to the network. In this regard, it should be understood that the access policy creation unit 242 may operate in conjunction with the memory 234 and the I/O port 232 to enable users to set and modify the access policy. For example, the access policy creation unit 242 may receive a set of instructions which indicates that temporary access to the network will be allowed until a determination of whether to admit the communication flow can be made, and may interface with memory 234 to store these instructions. The instructions may also designate a portion of the network's bandwidth to be available for such temporary access. Further, these instructions may dictate which applications and priority levels of communication flows will be admitted depending on availability of bandwidth. Accordingly, for example, the access policy creation unit 242 may enable the entry and storage of a table of values and/or an algorithm for determining admittance. Moreover, the access policy may dynamically change the behavior of the network. For example, a rule determining which packet markings to allow access to the network or which to discard may be modified. Alternatively or additionally, the amount of bandwidth designated for transient communications on the network may be varied.

The processor 240 may execute the instructions input through the access policy creation unit 242, and may cause such policy to be enforced. For example, the processor 240 may include an access policy determination unit 243, an access policy enforcement unit 244, and a resource determination unit 246. The resource determination unit 246 may assess how much bandwidth is available on the network at a given time. It may also determine how much bandwidth is needed by the requesting application. The processor 240 may use this information, along with the instructions from the access policy creation unit 242, to determine whether or not a communication flow should be admitted to the network. That is, the policies or instructions entered through the access policy creation unit 242 are provided to the access policy determination unit 243. When an event of interest occurs, such as when a request from a flow initiator is received, the access policy determination unit 243 makes a decision based on the policies. It then communicates that decision to the access policy enforcement unit 244. The access policy enforcement unit 244 may be an entity within the processor 244 which communicates a response to the flow initiator. Alternatively, the policy enforcement unit 244 may be the flow initiator itself, which receives a response from the access policy determination unit 243 and handles itself in accordance with that response. Further, the policy enforcement unit 244 may be the router 260, which handles packets from the flow initiator in accordance with instruction from the policy determination unit 243. If the processor 240 determines that the communication should be admitted, the access policy enforcement unit 244 may allow the communication and transmit a response to the requesting device. If, however, the processor 240 determines that admitting the flow would overburden the network, the access policy enforcement unit 244 may deny further communication from the requesting device for a predetermined amount of time. The access policy enforcement unit 244 may further be used to control communication flows that have already be admitted to the network in order to increase available bandwidth.

Although the memory 234 and processor 240 are functionally illustrated in FIG. 2 within the same block, it will be understood by those of ordinary skill in the art that the processor and memory may actually comprise multiple processors and memories that may or may not be stored within the same physical housing. For example, some or all of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In addition to the operations illustrated in FIGS. 1-2, an operation in accordance with a variety of aspects of the method will now be described. It should be understood that the following operations do not have to be performed in the precise order described below. Rather, various steps can be handled in reverse order or simultaneously.

Figure 3:
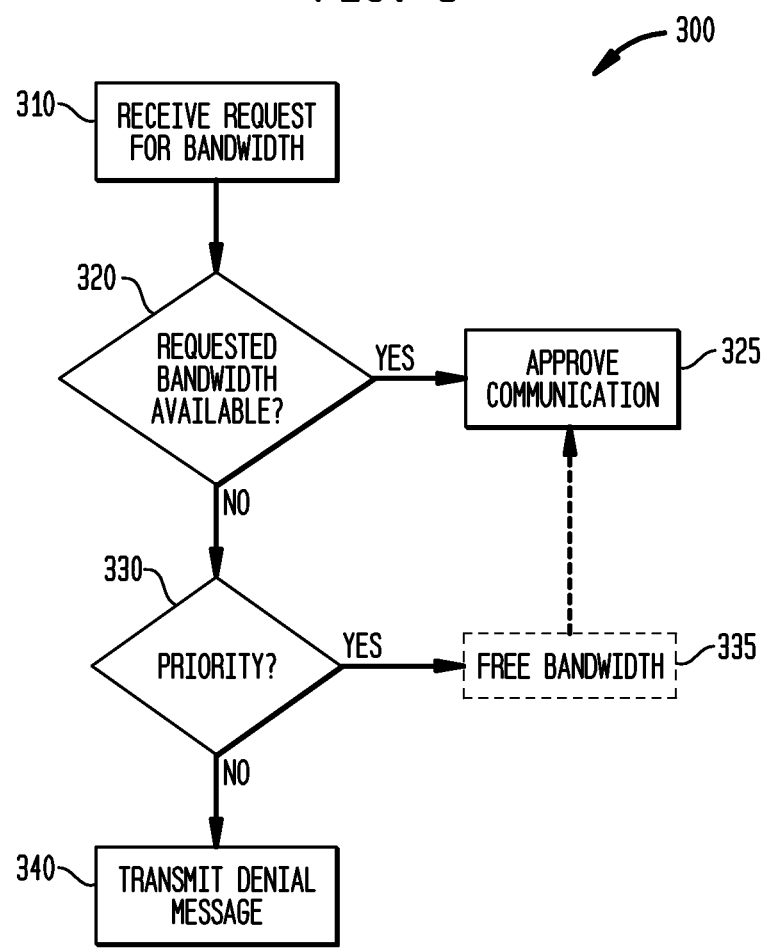
FIG. 3 illustrates an admission control method according to an aspect of the invention.

A method 300 of managing bandwidth allocation is shown in FIG. 3. According to the method 300, a request for bandwidth is received and handled based on a determination of available bandwidth on the network and priority of the request.

In step 310, a request for bandwidth (e.g., from a flow initiator 110) is received by the bandwidth broker 130. The request may include a variety of information, such as which application (e.g., IM, VoIP, web browser, etc.) desires to access the network 150, the duration of time for which access is requested, the amount of bandwidth requested for such access, etc. Additionally, the request may include an identification of priority of the network access. For example, the request may identify the requested access as critical, urgent, can wait x minutes, or low priority, just as some examples. It should be understood that any type of indicia may be used to designate the priority of access, such as colors, codes, etc.

Without waiting for a response from the bandwidth broker 130, the flow initiator 110 may begin the requested communication (i.e., begin transmitting packets over the network 150).

In step 320, the bandwidth broker 130 determines if bandwidth sufficient to satisfy the request is available on the network 150. For example, the resource determination unit 246 may assess how much bandwidth is already taken up by existing communications through the network, and may evaluate how the consumption of additional bandwidth by the requesting device would impact the network 150.

It may be determined by the bandwidth broker 130 that ample bandwidth is available on the network 150, and thus that other communications through the network would not be impacted by the additional consumption of bandwidth by the flow initiator 110. Accordingly, such communication may be approved in step 325. Alternatively, it may be determined that permitting the flow initiator 130 to access the network 150 would cause some congestion on the network. While some congestion on the network 150 may be acceptable, overloading the network 150 to a certain degree may not be. Accordingly, communications that would not greatly burden the network 150 may also be approved in step 325. Approval may be indicated to the flow initiator 110 by, for example, transmitting a response to the flow initiator 110. Because the flow initiator 110 may have already begun communicating over the network 150, the flow initiator 110 may simply continue to do so. The response from the asynchronous bandwidth broker 130 may also specify the available resources in a way that would cause the flow initiator 110 to either consume more or less of some resource. For example, an interim policy used by the flow initiator's local policy engine might specify that a VoIP flow is allowed to start with the packets marked as being priority level 3. The response from the asynchronous bandwidth broker 130, based on its policy and its determination of the network conditions, might specify that packets should instead be marked with priority 5 (where 5 might be higher or lower priority).

If it is determined in step 320 that admitting a flow from the flow initiator 110 to the network 150 would overburden the network 150, the priority of the requested communication may be evaluated in step 330. Such evaluation may be performed by the bandwidth broker 130, a router, or a combination of such components. According to one aspect, the evaluation may compare the priorities of the requested communication and the communications accessing the network 150. According to another aspect, the evaluation may determine that any level of priority at or above a predetermined level should be admitted to the network 150. Priority may be based on the importance of the communication, and in some embodiments may also be based on the required bandwidth for particular applications. For example, while a requested VoIP communication and an instant message may have approximately equal importance, the instant message may take priority over the VoIP communication because it consumes less bandwidth. If the evaluation results in a determination that the communication takes priority, the communication may be approved (step 325).

One potential option may be to free a predetermined amount of bandwidth in step 335, for example, by reducing the resources previously assigned to another flow. The predetermined amount may be enough to relieve congestion from the network 150 when the prioritized communications are allowed. For example, the amount of bandwidth that is freed may be approximately equal to the amount of bandwidth requested by the flow initiator 110. Alternatively, the amount of bandwidth may be a fixed value.

The asynchronous bandwidth broker may free bandwidth in any of a number of ways. For example, the bandwidth allowance of all flows over the network 150 may be decreased. Alternatively or additionally, it may be determined if any applications are no longer utilizing their allocated bandwidth, and such bandwidth may be reallocated. Yet another possibility is that communications of a predetermined priority, such as a lowest priority, may be paused or terminated.

If the evaluation of priority of step 330 results in a determination that the requested communication does not take priority, the request for bandwidth transmitted by the flow initiator 110 may be denied in step 340. This includes transmission of a message to the flow initiator 110 indicating that the request was denied. According to one aspect, it may also include terminating the transmission of packets over the network 150 already begun by the flow initiator 110. Additionally, the asynchronous bandwidth broker may instruct routers in the network to drop packets previously sent.

Though the present invention is described in the context of providing access to network bandwidth, these descriptions are merely illustrative. In general, the present invention may be applied where there is brokering of any network resources. Those network resources may include for example latency, jitter or network element processing time.

According to one aspect of the invention, priority of communications over the network 150 may be designated by markings on packets. The markings may include any type of predefined code. Setting of the priority levels may be based on content, application, user-defined requirements, weight, or any combination of these or other parameters.

Figure 4:
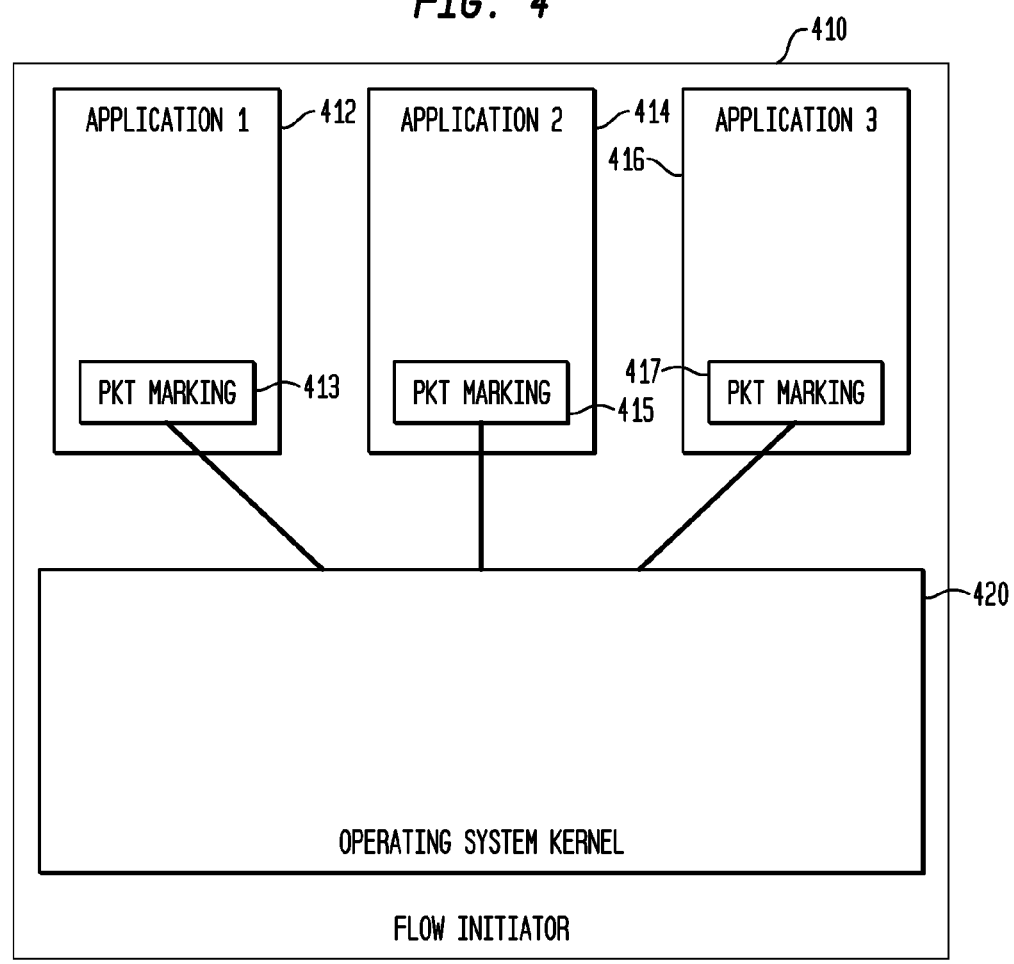
FIG. 4 illustrates an end-user device according to an aspect of the invention.

As shown in FIG. 4, marking may be performed by an application (e.g., Applications 1-3, denoted by elements 412, 414, 416) running on a computing device such as flow initiator 410. The flow initiator 410 may include an operating system kernel 420 which communicates with and controls the applications 412-416. Each application 412, 414, 416 may include a unit which performs packet marking, such as packet marking units 413, 415, 417. For example, if application 412 is an instant messaging application, it may always designate the packets as "5" or "low delay." Alternatively, application 412 may receive input from a user as to which marking to use. Accordingly, following the same example, a packet sent using an instant messaging application may be changed to "1" or "critical."

Figure 5:
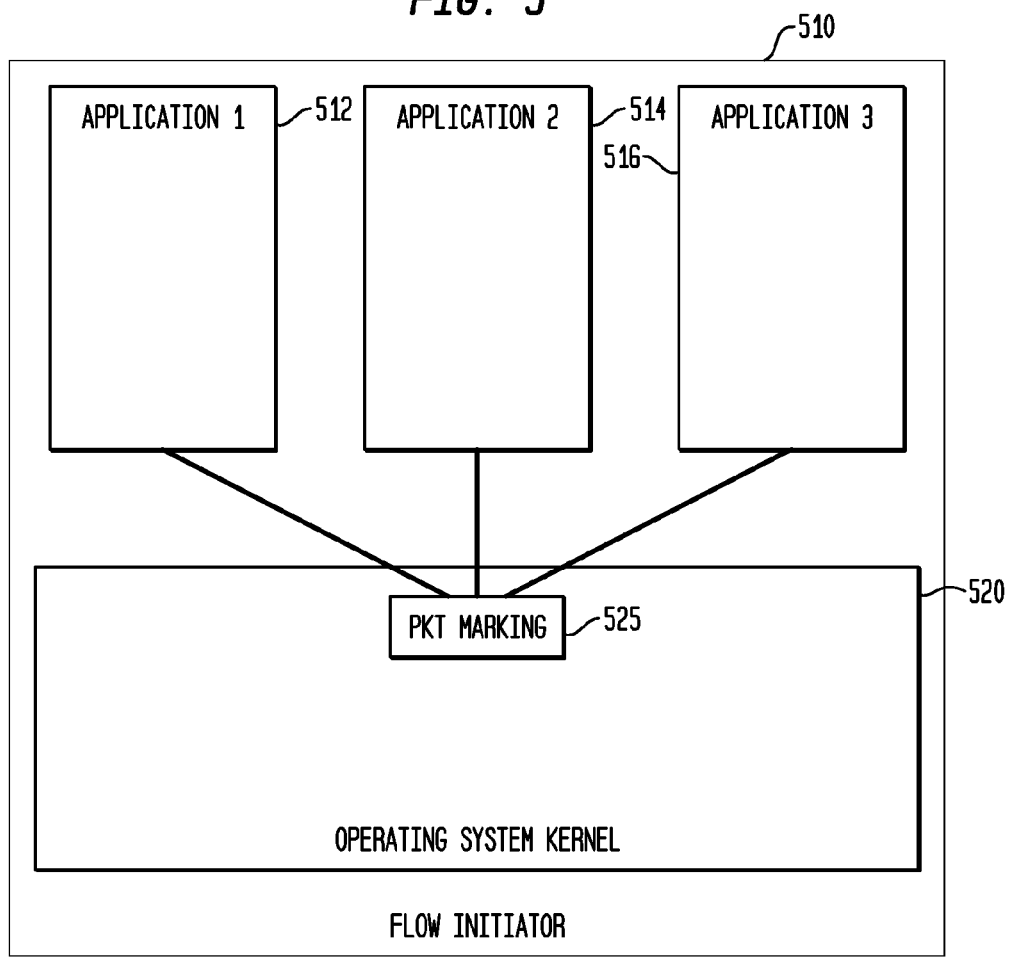
FIG. 5 illustrates an end-user device according to another aspect of the invention.

An alternative embodiment is shown in FIG. 5. For example, applications 512, 514, 516 may not be trusted to perform the packet marking. Accordingly, packet marking may be performed by operating system 520 of flow initiator 510. That is, the applications 512-516 may transmit packets to the operating system 520. The operating system 520 may include a packet marking module 525 which assigns a marking to the packets sent by the applications 512-516. Similar to the example of FIG. 4, the marking may be based on the application, the content, or user-defined settings.

Figure 6:
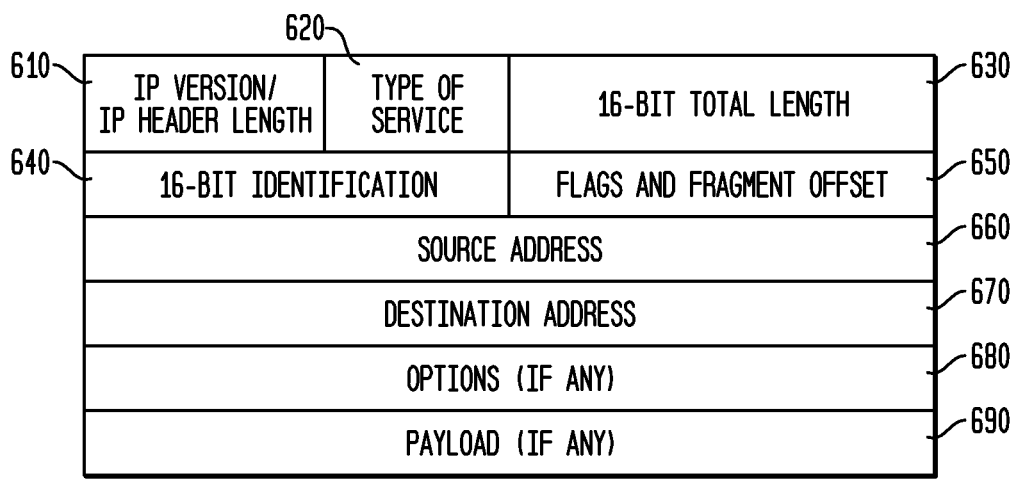
FIG. 6 illustrates a packet structure according to an aspect of the invention.

FIG. 6 shows the structure of a marked packet which is transmitted through the network 150. In this example, the network 150 is an IPv4 network. However, it should be understood that the principles of the present invention may be implemented on any network that provides a means of indicating priority in the headers of packets. Moreover, in a network with no priorities, the present invention would still work with the limitation that the asynchronous bandwidth broker has a more coarse grained control of the network. Additionally, the policy at the flow initiator would like be more conservative as the network would degrade much less gracefully in the face of congestion. The packet includes a header 610 which contains information on the internet protocol (IP) version and the IP header length. The IF version indicates the format of the internet header. The IP header length is the length of the Internet header in 32 bit words, and thus points to the beginning of the data.

Type of Service field 620 provides an indication of the abstract parameters of the quality of service desired. These parameters guide the selection of the actual service parameters when transmitting a packet through the network 150. Accordingly, the Type of Service field 620 may indicate priority by storing a value that allows the router, etc., to determine how to handle the packet.

The Total Length field 630 is the length of the packet, measured in octets, including internet header and data. This field may be 16 bits.

The Identification field 640 may include an identifying value to aid in assembling fragments of a packet. This value may be assigned by the transmitting device, and may be 16 bits in length.

The flags and fragment offset field 650 may include various control flags, such as whether fragmenting is allowed and whether it is the last fragment or if there are more. The flag and fragment offset field 650 may also indicate where in the packet this fragment belongs.

The Source Address field 660 and Destination Address field 670 may identify the source and destination of the packet, respectively.

Figure 7:
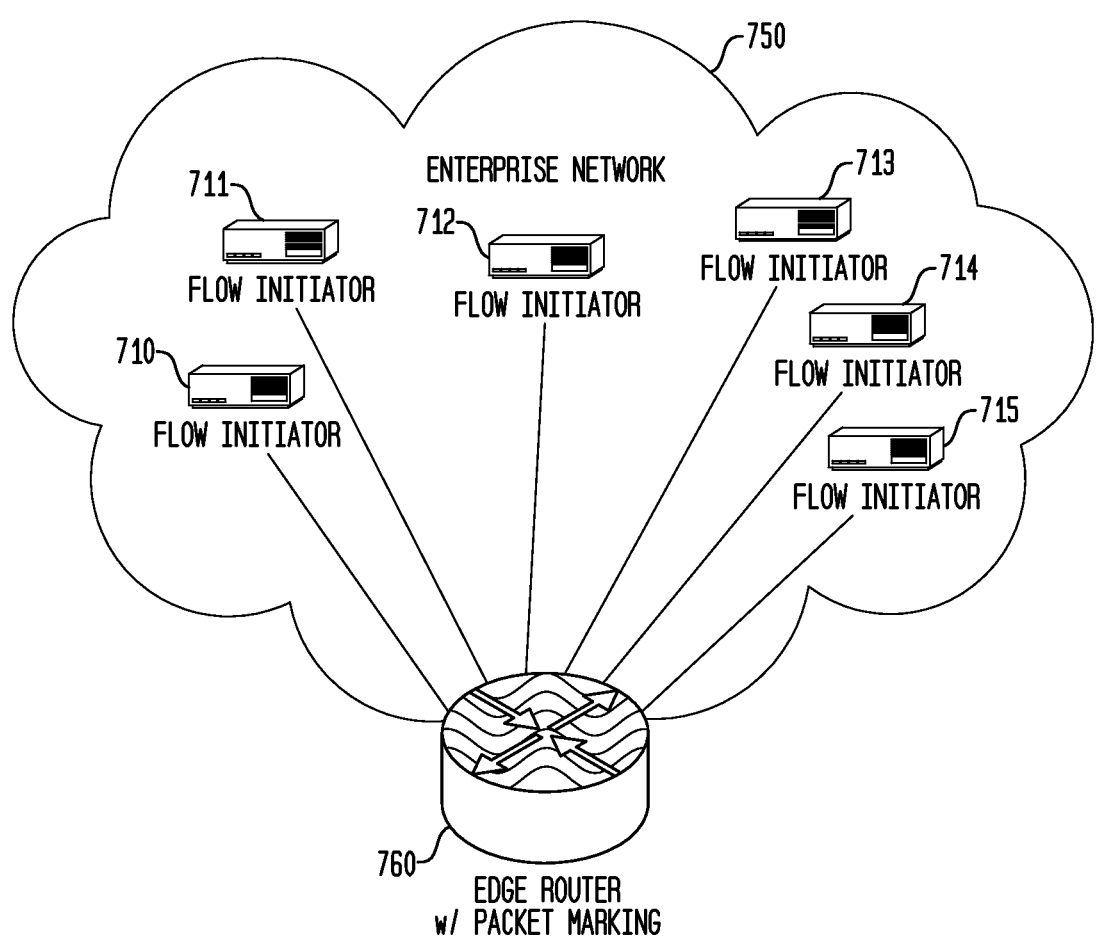
FIG. 7 illustrates an admission control system according to another aspect of the invention.

The options field 680 includes information which may or may not be transmitted. Examples of such information include security, loose source routing, strict source routing, Internet timestamp, etc. The payload field 690 may include the actual data to be transmitted. As mentioned above, this data may be considered in determining an appropriate marking for the packet. FIG. 7 illustrates an example of managing bandwidth according to an aspect of the invention. In particular, this example provides another method of packet marking in contrast to the technique used in connection with FIGS. 4 and 5. In particular, if the flow initiator is not trusted to perform packet marking, this approach may be used.

In this example, a number of flow initiators 710-715 are operating on a network 750. The network 750 may be an enterprise network, which enables communication and resource sharing among a number of applications at relatively high speeds. Resources may be allocated for each of the flows over the network 750 by the asynchronous bandwidth broker. The flow initiators 710-715 may communicate not only with devices on the network 750, but also with other devices beyond the network 750. For example, the network 750 may be connected to another network through router 760. The other network may be any type of network, such as another enterprise network or a slower network. In this example, edge router 760 may perform shaping and policing (i.e., delaying or dropping packets that exceed the resource bounds granted by the asynchronous bandwidth broker).

Flow initiator 712 may be communicating with flow initiators 714 and 715 via instant message. The asynchronous bandwidth broker may assign to such communications 20% bandwidth on the network 750, and the packets transmitted may be assigned a marking of "5" by the asynchronous bandwidth broker. At the same time, flow initiator 713 may be conducting a VoIP session with a device beyond the network via the edge router 760. This VoIP session may be allocated 65% of the network's bandwidth, and the packets transmitted may be assigned a marking of "3" by the asynchronous bandwidth broker. Also at this time, the flow initiator 711 may request to initiate an internet download. Accordingly, flow initiator 711 may transmit a request for bandwidth to the asynchronous bandwidth broker. The asynchronous bandwidth broker may or may not be co-located on any of the devices shown, such as on the router 760, or elsewhere on network 750 or somewhere in the larger network beyond the router 760. Alternatively, the bandwidth broker may reside independently. The request may specify the application (i.e., web download), the priority (e.g., low delay), the estimated duration of the download (e.g., 15 minutes), and the approximate bandwidth required (e.g., 10 Mbps). Before waiting for a response from the bandwidth broker, the flow initiator 711 may begin the download. In the meantime, the bandwidth broker may determine that the requested 10 Mbps is 15% of the network's bandwidth capability, and that only 15% is available because of other devices communicating over the network 750. While the bandwidth broker may have otherwise denied such communication to avoid a risk of excessive congestion on the network, the bandwidth broker may recognize that the request designated a higher priority for the application. Accordingly, the bandwidth broker may grant the request for bandwidth. The router 760 may assign the packets a marking of "2." The bandwidth broker may stop permitting access of packets marked with 5 in order to increase the availability of bandwidth on the network.

Because the flow initiator is permitted to begin accessing the network in the transient period between transmission of an admission control request and receipt of the admission control response from the bandwidth broker, the network may be over-subscribed for that period of time. The impact to the admitted communication flows in the network may be minimized during this transient period by one or more techniques. These techniques may be implemented in, for example, the access policy determination unit 243.

According to a first method of minimizing impact on admitted flows, a configurable percentage ($\alpha$) of the network bandwidth may be set aside for flows in the transient period. Each traffic flow in the transient period may be allowed to utilize a configurable percentage ($\beta$) of this pre-allocated bandwidth. Thus, the bandwidth available to any single flow in the transient period will not exceed ($\beta \times \alpha$) of the network bandwidth. In the case of a network with differentiated classes of service, such a configurable percentage of the network bandwidth may be set aside for each class of service, with the exception of best effort (or classes for which no admission control is envisaged).

In a case where the network is very resource constrained, the policy may be that no resources are pre-provisioned for temporary flows. In such a case, it may be that only high priority flows or even no flows are allowed to access the network before the Bandwidth Broker makes the admission decision. Additionally or alternatively, lower priority flows already admitted to the network may be paused or terminated. In another extreme, where 100% of the network is available to flows in the transient period, flows before admission have the same access as admitted flows.

Another method for minimizing the impact of flows in the transient period is the use of best effort. That is, flows in the transient period use a "best effort" packet marking to send their data, wherein an application sends data whenever it must, in any quantity, and without requesting permission or first informing the network. For best-effort service, the network delivers data if it can, without any assurance of reliability, delay bounds, or throughput. Such classification may be included in the packet markings, for example, in the type of service field 620. Using this marking in cases where the network is under-subscribed will not impact the quality of service experienced by the transient flow. However, in cases where the network is over-subscribed, using the best efforts marking may cause the transient flow to experience a less adequate level of service, and in some instances, the transient flow may not be able to send packets through the network at all. Accordingly, the transient flow will not impact admitted flows.

Yet another method of minimizing impact on admitted flows may combine elements from the methods of setting aside bandwidth and using best effort. According to this method, pre-allocated bandwidth for the transient period may be used for certain high-priority traffic, such as a fire alarm. The remaining transient flows may use best effort while awaiting admission control decisions. Determination of which approach is used may be dynamically configured using a dynamic policy update mechanism. For example, this mechanism may be implemented within the access policy creation unit 242. With this approach, each time a flow is started, the current policy (which may depend on many factors including the bandwidth required by the application, the current state of the network, the time of day, the role of the user running the application, the geographical/topological location of the application, etc.) is checked. Most likely, the asynchronous bandwidth broker will use the policy determination unit 243 to determine the correct marking and will send that to the flow initiator as part of its response. However, it would be possible that the asynchronous bandwidth broker, in consultation with policy determination unit 243, would tell the flow initiator that it was being allocated classification X. The policy determination unit 243 on the flow initiator would then use that along with other factors such as the application type, the location of the node, etc., to determine the marking for each packet. That way, if the node were mobile, its markings might change over time without needing to consult with the asynchronous bandwidth broker again.

According to one aspect of the invention, an access policy may be configured to give some applications the bandwidth allocation that they would have in a more severe situation than the network is currently facing. For example, during the transient period, non-critical applications may be given the resources that they would be given if the network were in disaster mode. When the bandwidth broker responds to the request for admission, it would then give the application resources that correspond to the current network behavior. Similarly, the bandwidth allocated to each flow initiator during the transient period may be based on the effects on the application. For example, a VoIP application initially primarily sends low bandwidth, latency insensitive traffic. If it is expected that a response to the admission request will be received by the VoIP application before call setup completes, the initial bandwidth allocation could be set based on the call setup requirements. Accordingly, it is ensured that if video starts before a response is received, high bandwidth video will not overwhelm the network.

Configuration of the network can also be used to control the transient behavior. For example, in a network with differentiated services, the bandwidth allocation for packet markings most likely to contain transient traffic may be lowered or raised depending on the current behavior of the network. Further, packet markings may be chosen so that transient traffic and admitted traffic will never use the same packet markings. Accordingly, the policy enforcement unit 244 or routers 260 may be configured based on the current network state. For example, each class of service could be given to adjacent packet markings, one odd, one even. The odd values would be available to applications for assignment to transient traffic. The even values would be given out by network admission. Under normal operations, each packet marking pair would be treated identically. During a crisis, however, non-critical transient packet markings as well as transient packet markings available to high bandwidth applications could be curtailed while critical transient packet markings would continue to be handled as critical traffic. In contrast, if the network were under attack, transient critical packet markings would likely be curtailed (as a tempting target to an attacker).

According to another aspect of the invention, provisioning of the network may occur after a response granting access to a requesting communication flow is granted. This may be particularly beneficial where provisioning of the network is expensive. For example, in some networks a round-trip time (i.e., a time for transmitting a request from an application to the bandwidth broker and transmitting a response to the request from the bandwidth broker) may be relatively short. Accordingly, the flow initiator may be required to wait for a response from the bandwidth broker indicating that the communication flow is allowed prior to sending packets over the network. Access to the network will nevertheless be gained relatively quickly. The determination of whether to admit or deny a communication flow may be based on any of a number of factors, such as priority of the flow, approximate bandwidth required for the flow, etc. The bandwidth broker may then provision the network.

In provisioning the network, the bandwidth broker may assess the availability of resources on the network, and may also consider the priorities of the communication flows consuming such resources. Accordingly, the bandwidth broker may reallocate resources to the communication flows on the network. This may include transmitting messages to devices or applications that they must cease transmission of packets or reduce the amount of bandwidth consumed. For example, the flow initiator that initially requested access may receive an update from the flow manager limiting an amount of bandwidth for the requested flow. As a further example, applications already communicating over the network may receive messages restricting their resource consumption. Some devices or applications may be allocated an increased amount of resources. In addition, or alternatively, to reallocating resources, the bandwidth broker may enforce allocations already made more strictly. For example, the bandwidth broker may instruct routers to enforce restrictions on bandwidth for particular flows.

The present invention is advantageous in that critical short duration communication flows are enabled to communicate over the network immediately, without waiting for a response that access has been granted. Additionally, typically the quality of service of previously admitted flows will not be greatly impacted. At worst, the quality of service of a previously admitted flow may suffer temporarily until the admission decision is made that the network is oversubscribed.

Moreover, the present invention optimizes for the case where the network is normally undersubscribed. Because of requirements for redundancy, future growth, or just because the application load is not well known when the network is built out, many networks have more capacity than is needed. In this case, waiting for an admission control decision poses an overhead with only a rare benefit. However, in the case where a failure occurs and the network suddenly becomes oversubscribed, network admission control (and pre-emption) is often the only way that the network can continue to provide value. The present invention allows this with low overhead.

Even further, the present invention allows critical flows to operate in a timely fashion in a network where quality of service is maintained. For example, if a fire alarm is pulled, the amount of data being sent is not large enough to impact the network, but the data being sent is critical. Nonetheless, it is important that bandwidth broker be aware of the flow so that if many fire alarms are being pulled at the same time, it can avoid admitting other traffic that would oversubscribe the network.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
receiving a request to allow a communication flow over a network;
at least temporarily allowing the communication flow over the network prior to making a determination of whether the network can handle the communication flow, wherein a period of time during which the communication flow is temporarily allowed comprises a transient period;
allocating a first configurable percentage of total network bandwidth for use by a plurality of communication flows occurring during the transient period;
determining availability of a network resource to be used by the communication flow;
determining a priority of the communication flow; and
responding to the request based at least in part on the availability of the network resource and at least in part on the priority.

2. The method of claim 1, further comprising reserving the network resource for the communication flow.

3. The method of claim 1, wherein the network resource is based on at least one of bandwidth, latency, jitter, and processing time.

4. The method of claim 1, wherein responding to the request includes at least one of allowing the communication flow to be completed, terminating the communication flow, or modifying the network resource allocated to the communication flow.

5. The method of claim 1, further comprising marking packets transmitted in the communication flow to designate the priority.

6. The method of claim 5, wherein the responding is based at least in part on a policy for responding to temporarily allowed communication flows, and wherein the policy is based on one or more of packet markings, content of the communication flow, or an application defining a type of the communication flow.

7. The method of claim 1, wherein the network resource allocated to the communication flow varies based on at least one of a type of the communication flow or the priority of the communication flow.

8. The method of claim 1, further comprising asynchronously modifying the network resource allocated to the communication flow if the communication flow is allowed to be completed.

9. The method of claim 8, wherein asynchronously modifying the network resource allocated to the communication flow is performed in response to receipt of a request for a higher priority communication flow than the allowed communication flow.

10. A system comprising:
a receiver configured to receive a request to allow a communication flow over a network;
a processor operatively coupled to the receiver and configured to determine one or more available resources on the network at a time of receiving the request; and
a memory operatively coupled to the processor and configured to store at least a portion of a network admission policy, wherein the network admission policy at least temporarily permits the communication flow over the network before a response to the request is transmitted, wherein the network admission policy defines which requests to grant based on at least one of the one or more available resources, a network resource that will be used for the communication flow, and a priority of the communication flow, and wherein a period of time during which the communication flow is temporarily permitted comprises a transient period;
wherein the processor is configured to allocate a configurable percentage of total network bandwidth for use by a plurality of communication flows occurring during the transient period;
wherein the processor is further configured to execute the network admission policy and generate the response to the request.

11. The system of claim 10, wherein the receiver is further configured to receive, from a user, a setting or modification to the network admission policy.

12. The system of claim 11, wherein the processor is further configured to update the network admission policy based on the received setting or modification.

13. The system of claim 10, wherein the processor is further configured to update the network admission policy based on communications allowed in the network at the time the request is received.

14. A non-transitory computer readable medium having instructions stored thereon, the instructions comprising:
instructions to receive a request to allow a communication flow over a network;
instructions to at least temporarily allow the communication flow over the network prior to transmitting a response to the request, wherein a period of time during which the communication flow is temporarily allowed comprises a transient period;
instructions to allocate a configurable percentage of total network bandwidth for use by a plurality of communication flows occurring during the transient period;
instructions to determine available network resources on the network;
instructions to determine a priority of the communication flow; and
instructions to generate the response to the request based on one or more of the available network resources, network resources that will be used to fulfill the request, and the priority.

15. A method comprising:
sending, by a client device, a request for access to one or more network resources of a network;
accessing the one or more network resources before a response to the request is received, wherein a period of time during which the one or more network resources are accessed prior to receipt of the response comprises a transient period, and wherein access during the transient period is to a portion of a configurable percentage of total network bandwidth that is allocated for use by a plurality of communication flows occurring during the transient period; and
receiving, from a network management system, the response to the request, wherein the response is based at least in part on a priority associated with the request.

16. The method of claim 15, wherein the request comprises a request for a communication flow over the network, and wherein the one or more network resource comprises bandwidth.

17. The method of claim 16, wherein the response to the request comprises allowing the communication flow, terminating the communication flow, or modifying the network resources allocated to the communication flow.

18. The method of claim 16, further comprising marking one or more packets transmitted in the communication flow to designate the priority.

19. The method of claim 16, further comprising marking the one or more packets at an application layer.

20. The method of claim 15, wherein the response is based on markings in a packet, content of a communication flow, or an application defining a type of the communication flow.

21. An apparatus comprising:
a transmitter configured to send a request for access to one or more network resources of a network;
a processor operatively coupled to the transmitter and configured to generate a communication flow and access the one or more network resources before a response to the request is received, wherein a period of time during which the one or more network resources are accessed prior to receipt of the response comprises a transient period, and wherein access during the transient period is to a portion of a configurable percentage of total network bandwidth that is allocated for use by a plurality of communication flows occurring during the transient period; and
a receiver operatively coupled to the processor and configured to receive, from a network management system, the response to the request, wherein the response is based at least in part on a priority associated with the request.

22. The apparatus of claim 21, wherein the processor is further configured to mark one or more packets included in the communication flow to designate the priority of the communication flow.

23. The apparatus of claim 21, wherein the one or more network resources are based on at least one of bandwidth, latency, jitter, and processing time.

24. The apparatus of claim 21, wherein the response denies the request, and wherein the processor is further configured to stop accessing the one or more network resources based on the response.

25. A non-transitory computer-readable medium having instructions stored thereon, the instructions comprising:
instructions to send a request for access to one or more network resources of a network;
instructions to generate a communication flow and to access the one or more network resources before a response to the request is received, wherein a period of time during which the one or more network resources are accessed prior to receipt of the response comprises a transient period, and wherein access during the transient period is to a portion of a configurable percentage of total network bandwidth that is allocated for use by a plurality of communication flows occurring during the transient period; and
instructions to receive, from a network management system, the response to the request, wherein the response is based at least in part on a priority associated with the request.

26. The non-transitory computer-readable medium of claim 25, wherein the one or more network resources are based on at least one of bandwidth, latency, jitter, and processing time.

27. The non-transitory computer-readable medium of claim 25, wherein the response denies the request, and further comprising instructions to stop accessing the one or more network resources based on the response.

* * * * *

UNITED STATES PATENT AND TRADEMARK OFFICE
CERTIFICATE OF CORRECTION

PATENT NO.         : 8,514,707 B2
APPLICATION NO.    : 12/647597
DATED              : August 20, 2013
INVENTOR(S)        : Alexander et al.

It is certified that error appears in the above-identified patent and that said Letters Patent is hereby corrected as shown below:

In the Specifications

In Column 6, Lines 14-15, delete "processor 244" and insert -- processor 240 --, therefor.

In Column 7, Line 18, delete "initiator 130" and insert -- initiator 110 --, therefor.

In Column 9, Line 2, delete "IF version" and insert -- IP version --, therefor.

In the Claims

In Column 14, Line 33, in Claim 14, delete "computer readable" and insert -- computer-readable --, therefor.

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,514,707 B2
APPLICATION NO. : 12/647597
DATED : August 20, 2013
INVENTOR(S) : Alexander et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 760 days.

Signed and Sealed this
Twenty-fourth Day of February, 2015

Michelle K. Lee
*Deputy Director of the United States Patent and Trademark Office*